Aug. 26, 1958      D. W. LUKS      2,848,802
METHOD OF SOFT SOLDERING TO NON-METALLIC REFRACTORY BODIES
Filed May 6, 1955
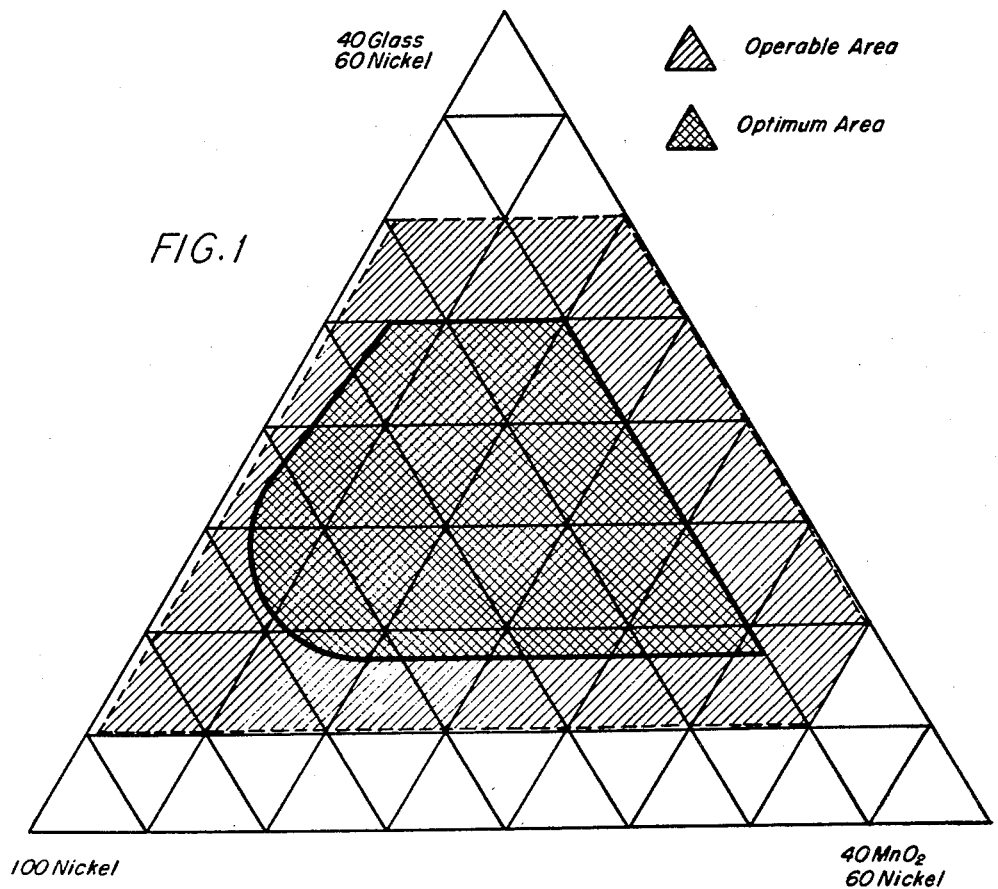
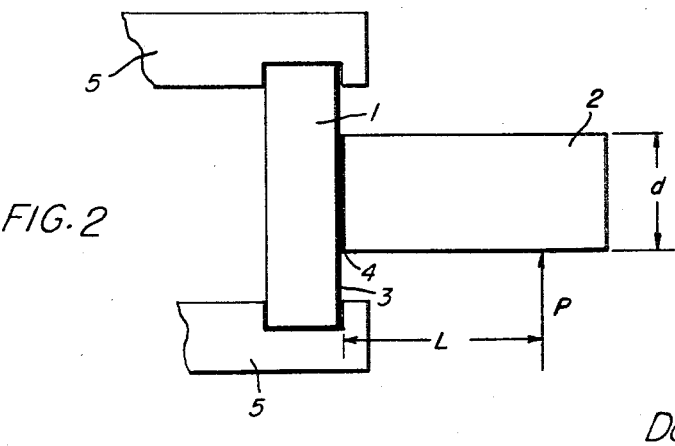
INVENTOR.
Daniel W. Luks
BY HIS ATTORNEYS

United States Patent Office

2,848,802
Patented Aug. 26, 1958

2,848,802
METHOD OF SOFT SOLDERING TO NON-METALLIC REFRACTORY BODIES

Daniel W. Luks, Frenchtown, N. J., assignor to Frenchtown Porcelain Company, Trenton, N. J., a corporation of New Jersey Application May 6, 1955, Serial No. 506,416

4 Claims. (Cl. 29—472.7)

This invention relates to coated non-metallic refractory bodies and particularly coated ceramic bodies, to a coating composition especially adapted for coating non-metallic refractory bodies, particularly ceramic bodies, and to a method for joining metal bodies to non-metallic refractory bodies, and non-metallic refractory bodies to one another by means of such coating.

In many industries it is necessary to join a refractory non-metallic body, such as a ceramic or a glass body to a metal body with a firm and in many cases, vacuum-tight joint. To make such joints, the non-metallic body is customarily covered with a metallic finish to which the metallic object may be joined by soldering. In general, two types of solder are used, hard solder or soft solder. The present invention deals with metallic finishes suitable for soft solder work. Soft solders are those that melt in the approximate range between about 275° F. and about 450° F.

In the past when it has been desired to provide non-metallic bodies with a metallic coating suitable for soft soldering, a fired silver coating has been applied and then a coating of copper applied by electroplating on top of the silver. If the copper is not put on and it is attempted to soft solder directly to the silver coating the solder dissolves the silver, removing it from the ceramic. Moreover, even with the superposition of a plated copper layer the bond between the silver coating and the ceramic is not as strong as might be desired.

One object of the present invention is to provide coated non-metallic refractory bodies to which soft solder will form a strong, firmly adhering bond approaching the inherent tensile strength of the ceramic itself.

It is another object of the present invention to provide a composition suitable for forming a metallic coating on non-metallic refractory bodies to which metallic articles, or other similarly coated non-metallic refractory articles, may be soft soldered directly.

A further object of the invention is to provide a method for joining metal bodies to non-metallic refractory bodies by means of a single coating adaptable to soft soldering.

A further object of the invention is to provide a method for joining non-metallic refractory bodies to other non-metallic refractory bodies by means of single layer metallic coatings which may be soft soldered directly to one another.

According to the invention, these and other objects are obtained through a non-metallic refractory body having a coating which comprises from about 60% to about 94.5% by weight, preferably between about 64% and about 84% by weight, of a heavy metal selected from the group consisting of nickel, cobalt, and iron, from about 0.5% to about 30% by weight, preferably between about 2% and about 27% by weight, calculated as $MnO_2$, of a manganese constituent and from about 5% to about 30% by weight, preferably between about 8% and about 25% by weight glass.

In the finished product the heavy metals are present in their elemental state. They are preferably added as the elements.

The manganese, as pointed out below, forms a flux with the glass and in the course of flux formation portions of the manganese probably form manganese protoxide (MnO). The extent to which protoxide formation occurs is not known precisely and will depend on the reactivity of the glass. For the sake of convenience the proportions stated have been based on $MnO_2$.

The manganese is usually added as $MnO_2$. However, it may also be added as elemental manganese or as other manganese compounds, such for example as manganese tetra borate ($MnB_4O_7$), manganese carbonate ($MnCO_3$), manganese dichloride ($MnCl_2.4H_2O$), manganese hydroxide ($Mn(OH)_2$), manganese pyrophosphate $$(MnP_2O_7)$$

manganese sulphate ($MnSO_4$) and potassium permanganate ($KMnO_4$).

When manganese is introduced as a compound other than $MnO_2$, the proportion added is such that the manganese content, calculated as $MnO_2$, will fall within the stated range.

Many different glasses or frits may be used in the present compositions. The glass should be water-insoluble and should be selected to match the coefficient of thermal expansion of the ceramic to which it is applied. The glass should form a flux with the manganese within the firing range set forth below (between about 1300° F. and about 2400° F.).

Glasses having these properties are readily compounded by those skilled in the art from mixtures of silica ($SiO_2$) and various combinations of the oxides of aluminum ($Al_2O_3$), boron ($B_2O_3$), sodium ($Na_2O$), potassium ($K_2O$), lithium ($Li_2O$), calcium ($CaO$), magnesium ($MgO$), barium ($BaO$), lead ($PbO$), and zinc ($ZnO$), among other elements. Some suitable glasses are listed below:

TABLE 1

Glass composition

|  | A | B | C | D | E |
|---|---|---|---|---|---|
| Potassium oxide | 5.9 | 3.1 | ------ | 6.1 | 11.9 |
| Sodium oxide | 5.9 | 7.2 | ------ | 1.1 | 2.1 |
| Calcium oxide | 8.1 | ------ | ------ | 10.9 | ------ |
| Aluminum oxide | 9.5 | 17.5 | 5.3 | 14.3 | 21.0 |
| Boron oxide | 21.5 | 31.8 | ------ | ------ | ------ |
| Silicon dioxide | 49.1 | 41.4 | 41.6 | 67.6 | 65.0 |
| Barium oxide | ------ | ------ | 53.1 | ------ | ------ |

Of the three heavy metals, nickel is preferred with cobalt the second choice.

The coating may be applied to the body in any convenient way, as by means of a liquid vehicle, for example, as a water paste. Preferably, however, the coating is applied as a suspension in a liquid vehicle of the metallic ingredients, the glass, and a suitable binder, preferably of organic composition. In such suspension, the metals and glass are in finely divided form.

The suspension may be applied to the non-metallic body by any convenient method, such for example as dipping, brushing or spraying. The freshly coated body is then fired for a period of between about 15 minutes and about two hours, preferably between about 30 minutes and about one hour in an oven at a temperature between about 1300° F. and about 2400° F., preferably between about 1400° F. and about 2100° F., in a reducing atmosphere.

After firing, the body is cooled in a reducing atmosphere. It can then be soldered directly with a soft solder either to a metallic object or to another body similarly coated.

The invention therefore also provides a coating composition having a metallic-glass base comprising between about 60% and about 94.5%, preferably between about 65% and about 84% by weight of a heavy metal selected from the group consisting of cobalt, nickel and iron, a manganese constituent in a proportion, calculated as $MnO_2$, between about 0.5% and about 30%, preferably between about 2% and about 27% by weight, and between about 5% and about 30%, preferably between about 8% and about 25% by weight of glass, in combination with a liquid vehicle. Preferably a binder is also present.

The invention further provides a method for joining a metal body to a refractory non-metallic body or for joining two refractory non-metallic bodies to one another which comprises coating the refractory non-metallic body or bodies with a composition as described above, firing at a temperature between about 1300° F. and about 2400° F. in a reducing atmosphere and soldering the metal body to the coated refractory non-metallic body or the coated refractory nonmetallic bodies to each other by soft solder.

The term "refractory non-metallic body" is used in the present application to mean a body made of a material other than metal which will not melt, decompose, or change its shape or composition under the firing temperatures involved in forming the coatings described, i. e., 1300° F. to 2400° F.

The refractory non-metallic bodies suitable for use in the present invention may be of glass, such as Pyrex chemical ware, of ceramics such as porcelain, stoneware, and whiteware, of substances commonly referred to as simply "refractories," such as graphite, cordierite, steatite, silicon carbide, or alumina, or of fire brick. Ceramic materials may or may not be glazed before the coating is applied.

As pointed out above, the present coatings are preferably applied by means of a vehicle and a binder. Both the vehicle and the binder should be chosen so that they become completely vaporized at the firing temperature. Neither the binder nor the vehicle should leave a residue after firing. The vehicle and binder should not, of course, react with the metallic or glass components of the coating composition, either under room conditions or under firing conditions. Examples of suitable vehicles are water, benzene, the esters of fatty acids and alcohols of low molecular weight such as ethyl, butyl, and amyl acetate, ketones such as acetone and methyl-ethyl ketone (butanone), and higher ethers, such as glycol diethyl ether and diethyl carbitol. Of these, amyl acetate or acetone are preferred.

Examples of suitable binders are methyl methacrylate, and cellulose esters and ethers such as cellulose nitrate, cellulose acetate, cellulose butyrate, methyl cellulose and ethyl cellulose. Of these, cellulose nitrate or acetate are preferred.

In preparing a suitable suspension between about ¼% and about 3% binder, preferably between about 1% and about 1½% binder, and between about 25% and about 50% preferably between about 30% and about 35% vehicle based on the weight of the entire composition, are used.

The metallic and glass ingredients are finely ground to a particle size not greater than about 8 microns and preferably between about 1 and about 4 microns.

The binder is dissolved in the vehicle and the finely divided metals and glass are added to the solution with agitation. The agitation is continued until a uniform suspension is obtained.

The term "suspension" is used here to indicate that the solid particles of glass and metal are uniformly distributed throughout the vehicle, but are not dissolved. A true colloidal suspension may be obtained, but is not necessary.

The suspension is applied to the refractory non-metallic body to be coated either by brushing, by dipping, or by spraying, and the coated body is then placed in a suitable firing device, such as an oven, in a reducing atmosphere, and fired.

The firing temperature and time will vary with the precise composition of the coating, since there is an optimum firing temperature for each composition at which the best combination of soft solder wettability and bond strength are obtained. In general, the article will be fired at a temperature between about 1300° F. and about 2400° F. preferably between about 1400° F. and about 2100° F. By using a reducing atmosphere, for example, an atmosphere containing say about 15% hydrogen and about 85% nitrogen, any undesirable oxidizing impurities are removed.

After firing, the coated body is cooled in the oven in the protective atmosphere, after which it may be joined to metal objects or to other refractory non-metallic objects which have been similarly treated, by soft soldering.

In the drawings:

Figure 1 is a tri-axial diagram of a Ni-Mn-Glass system showing the outer limits and preferred ranges of compositions according to the invention.

Figure 2 is a schematic diagram illustrating a manner of testing a ceramic-to-ceramic bond made according to the invention.

In preparing Figure 1 of the drawings, glass of Composition A (Table I) was used on a refractory high alumina ceramic. The bodies were fired at 2050° F. for thirty minutes in an atmosphere of dry 15% hydrogen and 85% nitrogen.

In the compositions according to the invention, the heavy metals, nickel, cobalt and iron, are important in furnishing high wettability by soft solder and in giving a high bond strength.

The function of the glass and manganese is to form a flux for the heavy metal at a sufficiently low firing temperature to enable the coatings to be applied to various types of glass and ceramics.

The following examples illustrate the invention but are not to be taken as limiting the invention beyond the scope of the appended claims. The proportions given in the examples are parts by weight.

EXAMPLE I

A water paste consisting of 10 parts of a powdered glass having the composition listed in column "A" of Table I, 79.6 parts of powdered nickel and .05 part of manganese dioxide ($MnO_2$) was prepared. The powdered ingredients had a particle size between about 1 and about 8 microns. The mixture was ball-milled for about 24 hours until the powdered materials were thoroughly dispersed. The paste was then applied to an unglazed 79% alumina porcelain insulator and the coated body was placed in a muffle furnace whose temperature was about 2050° F. An atmosphere consisting of 15% $H_2$ and 85% $N_2$ was maintained in the furnace. After thirty minutes the insulator was allowed to cool to room temperature in the protective atmosphere. It had a uniform metallic coating, light grey in color. A copper wire was soldered to the coated insulator, with soft solder, using an electric soldering iron. The solder wetted easily and a firm bond was formed.

EXAMPLE II

The composition referred to in Example I was applied to a set of the test bodies illustrated in Figure 2. Each set of these bodies consists of a disc 1, one inch in diameter and 5/16" thick and a rod 2, one inch long and 7/16" in diameter. In testing the composition one face of the disc 1 and one end of the rod 2 were coated with the composition as at 3 and 4. The bodies were then fired and cooled in a reducing atmosphere. After cooling the coated surfaces were soldered together using a soft solder consisting of 95% tin and 5% silver. The disc was then clamped in a support and a load applied to the rod perpendicular to the axes of disc and rod at a point ¾ of an inch from the soldered surfaces. The load required for fracture of the bond was measured and the modulus of rupture was calculated according to the equation:

$$S = \frac{32PL}{\pi d^3}$$

where:
S is the modulus of rupture (lbs. per sq. inch)
P is the breaking force (pounds)
L is the distance in inches between the metallized face of the disc and the point at which the force P is applied, and
d is the diameter of the rod (inches)

The modulus of rupture for the composition described in Example I was 10,120 p. s. i.

EXAMPLES III TO XXIII

Examples III to XXIII are tabulated in Tables II and III. They illustrate various coating compositions and firing temperatures and show the strength of the ceramic-to-ceramic bonds which may be obtained by various compositions according to the invention.

In Examples III to XXIII, a liquid-mixture consisting of 1.56 parts cellulose nitrate (Parlodion) dissolved in 54.69 parts of amyl acetate was prepared. The powdered metallic and glass ingredients having a particle size between about 1 and 8 microns were then added to the liquid, and the mixture was ball-milled for about 24 hours until the solids were thoroughly dispersed. The non-metallic bodies were then dipped in the suspension, drained and fired.

In all of the examples, except Example XXIII, the coating was applied to a 78% alumina ceramic. In Example XXIII the coating was applied to a 78% alumina ceramic glazed with Glass A (Table I). The solder used in Examples III to XXIII consisted of 95% tin and 5% silver, melting at 473° F. The coatings were fired in a protective atmosphere consisting of 15% hydrogen and 85% nitrogen.

In testing the bond strength, the method described in Example II was used.

TABLE III

| Example No. | Solder wettability (95Sn-5Ag) | Modulus of rupture, p. s. i. | Coating applied to— |
|---|---|---|---|
| III | Excellent | 7,400 | 78% alumina ceramic. |
| IV | do | 3,800 | Do. |
| V | Poor | 6,620 | Do. |
| VI | Excellent | 3,890 | Do. |
| VII | Good | 11,300 | Do. |
| VIII | Excellent | 5,070 | Do. |
| IX | do | 8,570 | Do. |
| X | do | 7,400 | Do. |
| XI | do | 7,930 | Do. |
| XII | do | 11,300 | Do. |
| XIII | do | 6,620 | Do. |
| XIV | do | 11,300 | Do. |
| XV | do | 10,520 | Do. |
| XVI | do | 9,350 | Do. |
| XVII | do | 10,670 | Do. |
| XVIII | do | 10,920 | Do. |
| XIX | do | 9,120 | Do. |
| XX | do | 10,520 | Do. |
| XXI | do | 10,520 | Do. |
| XXII | do | 12,460 | Do. |
| XXIII | Good | 5,450 | 78% alumina ceramic, glazed with glass A. |

What is claimed is:
1. A method of joining a metallic body to a non-metallic refractory body which comprises coating said non-metallic refractory body with a composition consisting essentially of a metallic glass base, said base consisting essentially between about 60% to about 94.5% by weight of a powdered heavy metal selected from the group consisting of nickel, cobalt and iron, between about 0.5% and about 30% by weight, calculated as $MnO_2$, of a powdered manganese constituent and between about 5% and about 30% by weight powdered glass, in combination with a vehicle, firing said coated non-metallic refractory body at a temperature between about 1300° F. and about 2100° F. in a reducing atmosphere and soldering said metallic body directly to said coated body with soft solder.

2. The method claimed in claim 1 in which the base consists essentially of between about 65% and about 84% by weight of a powdered heavy metal selected from the group consisting of nickel, cobalt and iron, between about 2% and about 27% by weight, calculated as $MnO_2$, of a powdered manganese constituent and between about 8% and about 25% by weight glass.

3. A method for joining two non-metallic refractory bodies to one another which comprises coating said bodies

TABLE II

| Example No. | Glass | | Manganese | | Metal | | | Firing temp., °F. |
|---|---|---|---|---|---|---|---|---|
| | Type | Parts | Added as— | Parts | Ni | Co | Fe | |
| III | A | 10.00 | $MnO_2$ | 30.00 | 60.00 | | | 2,100 |
| IV | A | 5.00 | $MnO_2$ | 0.50 | 94.50 | | | 2,100 |
| V | A | 30.00 | $MnO_2$ | 10.00 | | 60.00 | | 1,500 |
| VI | A | 5.00 | $MnO_2$ | 0.50 | | 94.50 | | 2,100 |
| VII | A | 20.00 | $MnO_2$ | 20.00 | | | 60.00 | 1,800 |
| VIII | A | 5.00 | $MnO_2$ | 0.50 | | | 94.50 | 2,400 |
| IX | A | 20.00 | $MnO_2$ | 2.00 | 78.00 | | | 2,100 |
| X | A | 20.00 | $MnO_2$ | 2.00 | 78.00 | | | 2,100 |
| XI | B | 20.00 | $MnO_2$ | 2.00 | 78.00 | | | 2,100 |
| XII | C | 20.00 | $MnO_2$ | 2.00 | 78.00 | | | 2,100 |
| XIII | D | 20.00 | $MnO_2$ | 2.00 | 78.00 | | | 2,100 |
| XIV | E | 20.00 | Mn (metal) | 2.00 | 78.00 | | | 1,900 |
| XV | A | 20.00 | $MnO_2$ | 3.16 | 78.00 | | | 1,900 |
| XVI | A | 20.00 | $MnB_4O_7$ | 6.47 | 78.00 | | | 1,900 |
| XVII | A | 20.00 | $MnCO_3$ | 4.18 | 78.00 | | | 1,900 |
| XVIII | A | 20.00 | $MnCl_2.4H_2O$ | 7.20 | 78.00 | | | 1,900 |
| XIX | A | 20.00 | $Mn(OH)_2$ | 3.24 | 78.00 | | | 1,600 |
| XX | A | 20.00 | $Mn_2P_2O_7$ | 6.28 | 78.00 | | | 1,900 |
| XXI | A | 20.00 | $MnSO_4$ | 5.48 | 78.00 | | | 1,900 |
| XXII | A | 20.00 | $KMnO_4$ | 5.73 | 78.00 | | | 1,900 |
| XXIII | A | 20.00 | $MnO_2$ | 2.00 | 78.00 | | | 1,300 |

Metallized coatings were fired in a protective atmosphere of 15% hydrogen, 85% nitrogen.
Melting temperature of 95% Sn-5% Ag. Solder is 473° F.
*1.56 parts of cellulose nitrate and 54.69 parts of amyl acetate were added to each composition as binder and vehicle, resp.

with a composition consisting essentially of a metallic glass base, said base consisting essentially of between about 60% and about 94.5% by weight of a powdered heavy metal selected from the group consisting of nickel, cobalt and iron, between about 0.5% and about 30% by weight, calculated as $MnO_2$, of a powdered manganese constituent and between about 5% and about 30% by weight powdered glass, in combination with a vehicle, firing the coated bodies in a reducing atmosphere at a temperature between about 1300° F. and about 2100° F. and then soldering said coated bodies directly to one another with soft solder.

4. The method claimed in claim 3 in which the base consists essentially of between about 65% and about 84% by weight of a powdered heavy metal selected from the group consisting of nickel, cobalt and iron, between about 2% and about 27% by weight, calculated as $MnO_2$, of a powdered manganese constituent and between about 8% and about 25% by weight glass.

References Cited in the file of this patent

UNITED STATES PATENTS

| | | |
|---|---|---|
| 1,852,093 | Smede et al. | Apr. 5, 1932 |
| 2,282,106 | Underwood | May 5, 1942 |
| 2,335,376 | Ballintine et al. | Nov. 30, 1943 |
| 2,667,432 | Nolte | Jan. 26, 1954 |
| 2,776,472 | Mesick | Jan. 8, 1957 |